United States Patent [19]

Kyomen et al.

[11] Patent Number: 4,898,705
[45] Date of Patent: Feb. 6, 1990

[54] METHOD FOR PRODUCING SYNTHETIC RESIN UNION JOINT

[75] Inventors: Junsuke Kyomen; Masayuki Sakaguchi, both of Sakai; Hiroto Fujii, Kawachinagano, all of Japan

[73] Assignee: Kubotatekko Kabushiki Kaisha, Osaka, Japan

[21] Appl. No.: 194,529

[22] Filed: May 16, 1988

Related U.S. Application Data

[63] Continuation-in-part of Ser. No. 803,051, Nov. 15, 1985, abandoned.

[51] Int. Cl.$^4$ .................. B29C 55/24; B29C 57/06
[52] U.S. Cl. .................... 264/242; 264/249; 264/265; 264/274; 264/292; 264/343; 425/DIG. 19
[58] Field of Search .............. 264/230, 242, 249, 259, 264/265, 274, 276, 291, 292, 343, DIG. 71; 29/447, 450, 453, 235; 285/381, 382.4, 921; 425/DIG. 29

[56] References Cited

U.S. PATENT DOCUMENTS

| | | | |
|---|---|---|---|
| 2,985,469 | 5/1961 | Bowman | 29/453 |
| 3,401,447 | 9/1968 | Knight | 29/450 |
| 3,662,094 | 5/1972 | Wetmore | 264/230 |
| 3,755,524 | 8/1973 | McKay | 264/230 |
| 3,887,992 | 6/1975 | Parmann | 264/249 |
| 4,135,961 | 1/1979 | Yoshizawa | 264/249 |
| 4,181,698 | 1/1980 | Hayes | 264/249 |
| 4,231,983 | 11/1980 | French | 264/249 |
| 4,386,045 | 5/1983 | Vaisanen | 264/249 |
| 4,390,383 | 6/1983 | Van Dongeren | 264/322 |
| 4,586,228 | 5/1986 | Rudolf | 29/235 |
| 4,664,423 | 5/1987 | Rowley | 264/230 |
| 4,736,510 | 4/1988 | Jorg | 264/265 |
| 4,757,595 | 7/1988 | Fraering | 264/230 |

FOREIGN PATENT DOCUMENTS

| | | | |
|---|---|---|---|
| 877148 | 9/1961 | United Kingdom | 264/249 |
| 1524512 | 9/1978 | United Kingdom | 264/230 |

*Primary Examiner*—Jay H. Woo
*Assistant Examiner*—Jeremiah F. Durkin, II
*Attorney, Agent, or Firm*—Oblon, Spivak, McClelland, Maier & Neustadt

[57] ABSTRACT

A method for producing a synthetic resin union joint, the method including the steps of forming a union nut having a screw portion and a union sleeve of an elastically softenable material, the union sleeve having a union swivel end and a connecting end, heating a length of the union nut at least equal to a thickness dimension of the flange part but not extending to the screw portion so as to elastically soften the length of the union nut, abutting one end of a truncated cone-shaped expansion guide with an end face of the union swivel end, shifting and enlarging the length of the union nut along the expansion guide so as to pass over the union swivel end and so that the union nut passes over the guide, and returning the length of the union nut to its original configuration due to a restoring force of the elastically softenable material so as to be positioned within the union swivel end and the connecting end.

2 Claims, 6 Drawing Sheets

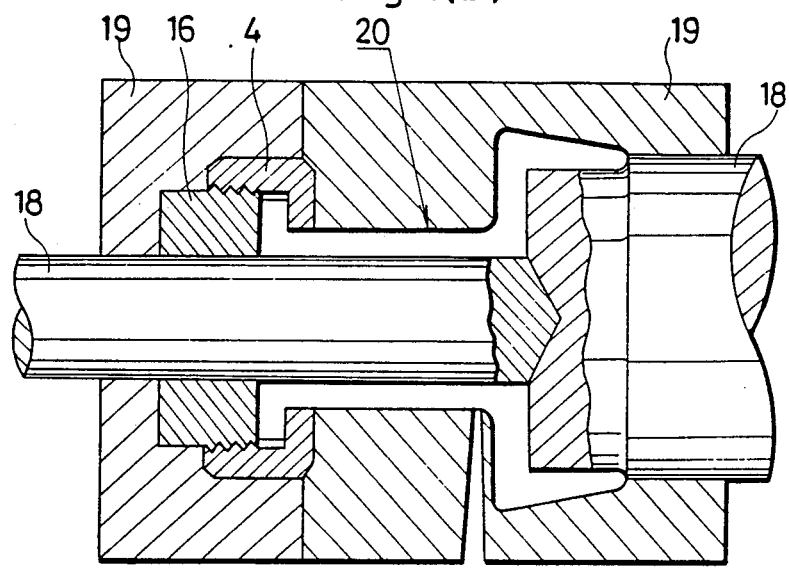
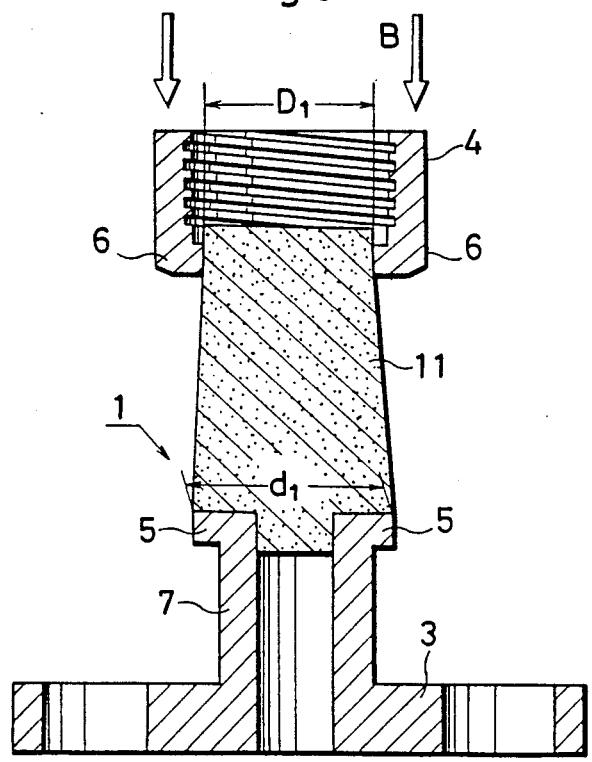

METHOD FOR PRODUCING SYNTHETIC RESIN UNION JOINT

This is a continuation-in-part application of Ser. No. 06/803,051 filed Nov. 15, 1985 now abandoned.

FIELD OF ART

The present invention relates to a method for producing a synthetic resin union joint which is used to connect a pipe and another pipe or pipe device such as a valve, cock and the like. Especially, this relates to a union joint of the structure such that a union swivel end and a connecting end is made in a unit shape, against the union swivel end of which a union nut is strongly and precisely coupled unless usual fastening means such as screws or weldings were used.

BACKGROUND ART

Several kinds of union joints are known, a connecting end of which is respectively provided with, for example, a straight or bent pipe joint having a screwing part, a flange part, an insertion or nipple part, a receptacle or socket part, another union part and the like. These connecting ends shall be made strong with a shape having a diameter equal to or larger than that of the union swivel end, so that connecting ends shall be constructed without usual fastening means such as screws, weldings, ring-couplings which were used to pass a union nut over the union swivel end before the union joint is assembled. Any interfaces which were included to assemble divided parts into a unit device should be deleted to increase strength and durability.

A prior union joint which has a flange type connecting end 3 in FIG. 1 used screw means 7a and 7b for allowing the union nut 4 to pass on a union sleeve 7 over the union swivel end 5 before the flange connecting end 3 will be assembled with the screw means 7a and 7b. In this, the screw 7a was provided on the center hole of the flange part 3, and a paired screw 7b was on the end of the union sleeve 7. A radial engagement section may be thus provided between the union nut 4 and the union swivel end 5 as required. The radial engagement section is determined by a difference between an inner diameter D1 of the union nut hole and an outer diameter d1 of the union swivel end 5. The union joint 1 thus constructed can screw the union nut 4 on a screwing end of a ball valve 2. However, it has a weak point at the screwed means 7a and 7b, at which cracking 10 took place, especially on the union sleeve 7, because thrust load which acts on the flange part 3 as vibrational, expandable or contractive force increases concentratively internal stresses at the base of screw flange part 3. Such construction is disclosed, for example, in Japanese Utility Model Open Publication Nos. 127477/81 and 144783/81.

FIG. 2 shows another prior union joint in which a split ring 14 is used in place of the structure of a union swivel end to product it with a flange type connecting end 3 and the union sleeve 7 made in a unit. To use split ring 14, the forward end section of the union sleeve 7 is worked to provide a groove 15 and a peripheral protrusion wherein the split ring 14 is occupied in the groove 15 and is supported by the peripheral protrusion. An outer diameter d2 of the peripheral protrusion is smaller than the outer diameter D1 of the union sleeve 7, so that the union nut 4, first and then the split ring 14 are inserted on the union sleeve 7 in order from the forward end. After such insertion, the split ring 14 is inserted by hand in the groove is and engaged by the peripheral protrusion so as to assemble the union joint 1. However, the weak point would be shifted and would appear at the split ring 14 or the periphral protrusion from the base of the flange connecting part 3. Durability also decreased in this assembly between the union swivel end 5 and the split ring structure 14. The resulting force facilitates the split ring 14 and/or the small peripheral protrusion being damaged, distorted or expanded to disengage themselves.

From such experience, an ideal structure was desired and resulted in the structure of FIG. 3 in which usual fastening means such as screw, threaded, welded, or splitted means is not used to construct the union joint. Further prior are related to this, is disclosed in, for example, Japanese Patent or Utility Model Open Publication Nos. 99,261/78 and 25,635/84.

As shown in FIG. 4a, a union nut 4 which was previously produced with the union screw is screwed with a splittable die block 16 of a hollow shape, and a bisectional mold 19 is assembled to include the combined union nut 4 and die block 16 for forming a molding space from which a union swivel end and a flange connecting end will be produced in a unit union sleeve, as shown in FIG. 4(a). A conduit pass of the union joint is made by insertion of two pins 18, 18 into the assembled bisectional mold 19. Molten synthetic resin is thereafter injected into the resultant cavity 20, and an ideal union joint may be obtained after the splittable die block 16 was removed from the union nut 4 and the resulting union sleeve during removal of the used bisectional mold 19.

An expensive cost has resulted from this prior art procedure due to complicated mold assembly and operation. Another unreasonable difficulty was that the union sleeve was required to have an axial length two times the axial length of the union nut 4, inasmuch as the splittable die block 16 can be removed between the resultant union swivel end and the union nut 4. The requirement of this longer sleeve induces wasteful material cost or decreased durability from the union joint. This drawback may be avoided according to the prior art referring to FIG. 4(b).

Some modification onto the above resulted in formation of partial cavity which remains between the union nut 4 and the splittable die block 16 screwed in the nut. However, there still remains many interfaces in the thus assembled mold, additionally including the screwed interface, which is exposed to the partial cavity for forming the union swivel end. Cost increases also resulted due to work finishing for removal of many complicated flashes. The resulting efficiency was too small to increase use of the injection machine and the many mold parts required because of their complexity.

DISCLOSURE OF THE INVENTION

The present invention provides a new method for producing the idealistic union joint referred to FIG. 3, which could not have succeeded heretofore, although still desired. That is, the union nut can be directly passed over the union swivel end in a manner in which the flange part of the union nut is heated to result in softened elasticity inasmuch as the same flange part will be temporarily and radially expanded and return to the original shape soonafter riding over. The resulting durability and strength of the thus produced union joint exceed snap engagement methods heretofore possible.

In other words, the present invention breaks with usual constructing techniques by making greater use of plastic properties, which were only modified from techniques applied in metal structure for constructing metal parts into a unitary device.

The process of the present invention is summarized as providing a method for coupling a union nut with a union sleeve having a connecting end and a swivel end formed integrally at respective ends thereof which comprises:

forming a guide face on the union swivel end with the diameter of said guide face progressively increasing as a flange part of the union nut is approached;

heating and softening a flange part of the union nut to make said flange part transform from a hard state to a softened elasticity state;

shifting and enlarging said softened flange part along said guide face until the flange part passes over the union swivel end; and returning said flange part to the original configuration with its restoring force of said softened elasticity state thereby to engage the flange part with the union swivel end on said union sleeve.

Various other objects, features and attendant advantages of the present invention will be more fully appreciated as the same becomes better understood from the following detailed description when considered in connection with the accompanying drawings in which like references characters designate like or corresponding parts throughout the several views and wherein:

BRIEF DESCRIPTION OF THE DRAWINGS

FIGS. 5 to 7 illustrate the process of the present invention for producing the ideal union joint as shown in sectional views;

BEST FORM FOR PRACTICING THE INVENTION

Figure 1:
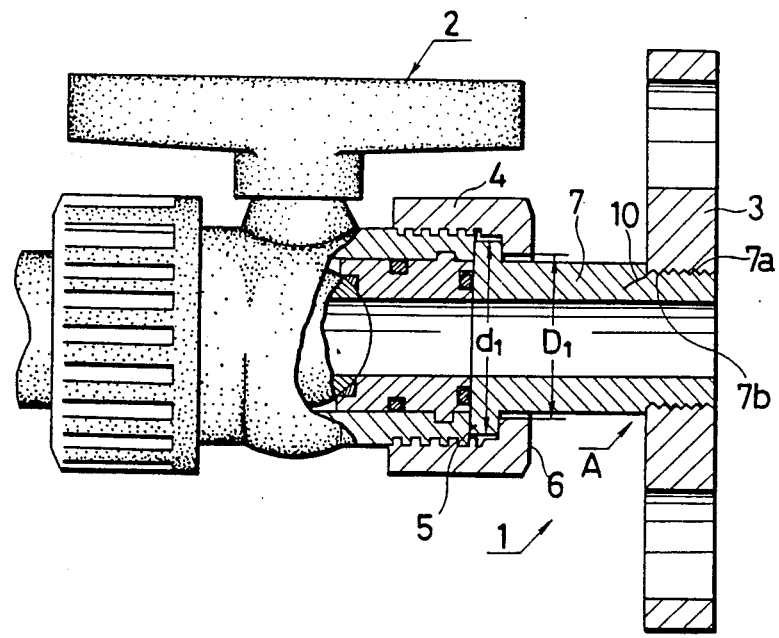
FIGS. 1 and 2 illustrate respectively conventional union joints made from a synthetic resin and having a flange type connecting end shown in sectional views.
Figure 2:
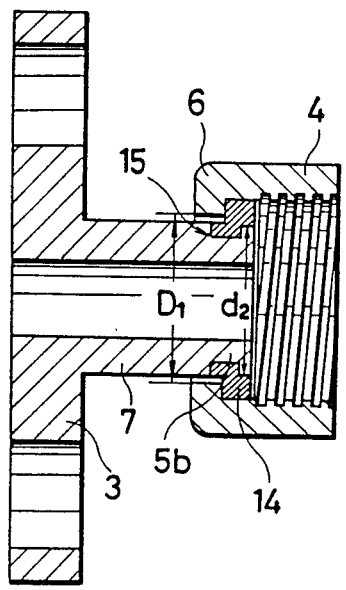
Figure 3:
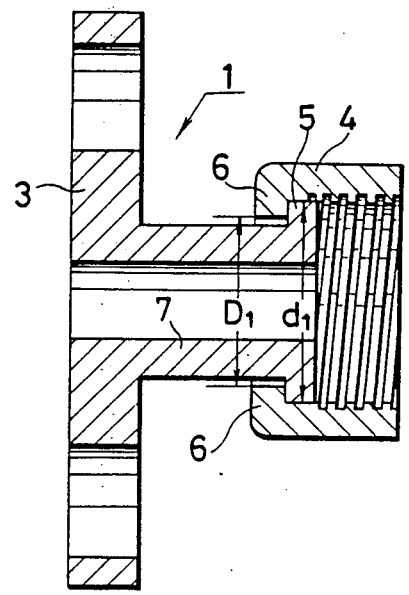
FIG. 3 is an idealistic model in showing sectional view of a union joint, the union nut of which is directly assembled with the union swivel end of a union sleeve having a flange type connecting end integrally made from a synthetic resin in a unitary shape, and which is succeeded in ideal production according to the present invention.
Figure 4A:
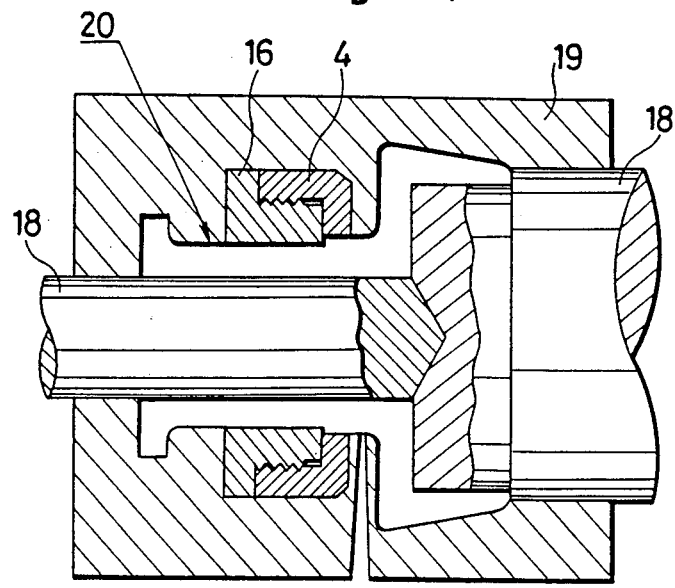
FIGS. 4(a) and (b) are respectively sectional views of conventional injection molds for producing an integrally formed union joint with a flange.

Referring to FIG. 3, the desired idealistic union joint having a connecting end such as a flange type, fitting type and the like, from the side of which the union nut couldn't be inserted to the union swivel end, can according to the present invention be unexpectedly produced in an integral structure without any fastening means such as screw, threaded, welded or ring-coupled means, when the union nut 4 having a nut hole of the flange part 6 with the diameter D1 smaller than the diameter d1 of a union swivel end 5 is made to ride over the same swivel end 5. Additionally, it was considered impossible to use a snapping engagement-type structure because its durability was generally too low to construct a union joint of this type.

Figure 9A:
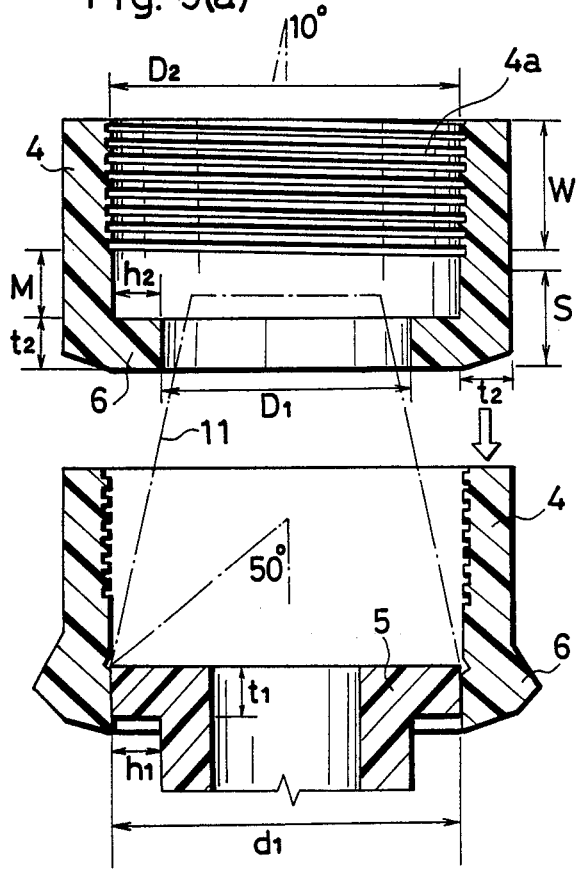
FIGS. 9(a)-9(c) illustrates a limitation test for supporting the conclusion of successful durability of the resulting union joint.
Figure 9B:
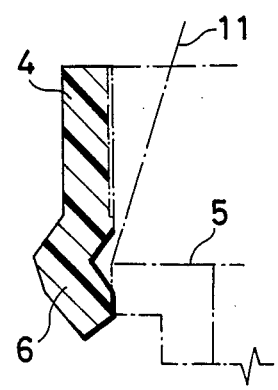
Figure 9C:
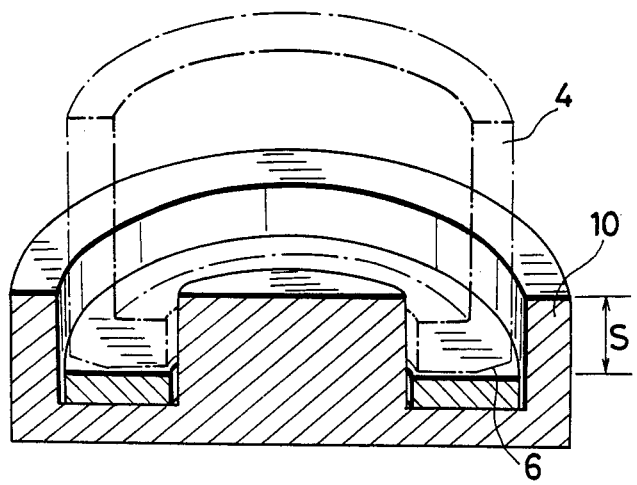

For development of the present invention occurred, so long as they were technically possible. They resulted in a process in which a softened elasticity characteristic allows the vertical flange part 6 to ride over the swivel end 5 and to return to the original a configuration of the desired union nut. Limitation tests in FIGS. 9(a)-9(c) shows the use of softened elasticity which is utilized by heating a union nut 4 made of unplasticized polyvinyl-chloride resin (JIS K6742) at 150° C., which allows the vertical and circular inner-face of the vertical flange part 6 to be temporarily turned to an almost tubular state and further to return the same tubular deformed face to the original vertical configuration soonafter such temporary deformation is finished [FIG. 9(a)]. It is assured that such softened elasticity may keep balanced the limitable deformation up to a peak value at which the vertical and circular face is finally turned to the almost tubular state for preventing abnormal deformation.

The sample union nut 4 with the outer diameter 121 mm was heated in a heater 10 wherein the heating area was changeable by decreasing or increasing the heating depth S [FIG. 9(c)].

The sample was measured as follows:

The thickness t1 of the swivel end 5 and t2 of the union nut 4 were 12 mm; the end 5 had a diameter $d1=96$ mm and the nut 4 an inner diameter $D2=97$ mm and hole diameter $D1=80$ mm; the end height $h1=8.5$ mm and the flange part height $h2=8.5$ mm; margin $M=8$ mm between flange part 6 and screw section 4a; screw range $W=30$ mm; and heated range $S=12$ mm, wherein the difference between D2 and d1 was 1 mm (0.5 mm as a radius). When the same union nut 4 is heated over a heating range $S=20$ mm and at 140° C., the resulting softened elasticity of the material makes the flange part 6 from a widened L shape in sectional configuration on the top of the swivel end 5, and to return to the original flange configuration soonafter [FIG. 9(b)].

There is nothing to weaken, deform or distort the returned flange part 6 while the screw configuration is unchanged, and the union nut 4 which has been thus engaged with the union swivel end 5 smoothly rotates on the union sleeve 7 at the provided maximum gap 1 mm. Different deformations between FIGS. 9(a) and 9(b) which result from softened elasticity depend on the difference in heating temperatures (e.g., heating at 150° C. or 140° C.) and also heated ranges (e.g. 12 mm or 20 mm) equal to or larger than thickness 12 mm of the flange part. That is, the longer heated range 20 mm may radially expand from the innermost point and maintain the vertical configuration inasmuch as it may be widened slightly, and the shorter heated range 12 mm promotes more expandable action onto the vertical and circular inner-face of the vertical flange part 6 to assume to an almost tubular state. Such harmonized expansion allows for a return to the original configuration and extends to a limitation range which requires the production of an ideal union joint which facilitates industrialization of the process and from which unexpected usefulness results.

For example, when the union nut 4 is made of polyvinyl-chloride, it shall be heated and softened at a range from 120° C. to 140° C. and thus lower than the melting point of 180° C. For other kinds of synthetic resin will select heating temperature lower than their melting points to utilize effective softened elasticity. Accordingly, after heating and softening various union nuts 4, their flange parts 6 with a respective diameter D1 are safely and smoothly expanded to the same or some larger range as the outer diameter d1 of a union swivel end 5 of a union sleeve 7 which was integrally formed with a connecting end 3, and they facilitate overriding and engage with the swivel end 5 by returning to their original configurations soonafter riding over. The restoring force is softened elasticity is carried out by the synthetic resin used. The process finishes almost within a time span of 1/10 seconds after being heated. Durability required at a desired union joint is provided with appropriate sizes of diameters D1, d1 and thickness t1 and t2, which are always stronger than snappling engagement structure or other usual fastening means such as screw threaded, welded, binded or ring-coupled means.

In the event the union nut undergoes a deformation exceeding the normal elastic deformation range, or where the elastic restoring force of the selected material is relatively weak, the temporarily expanded flange part 6 may be cooled or reduced to return to the original configuration by use of an auxiliary jig (not shown).

Figure 6:
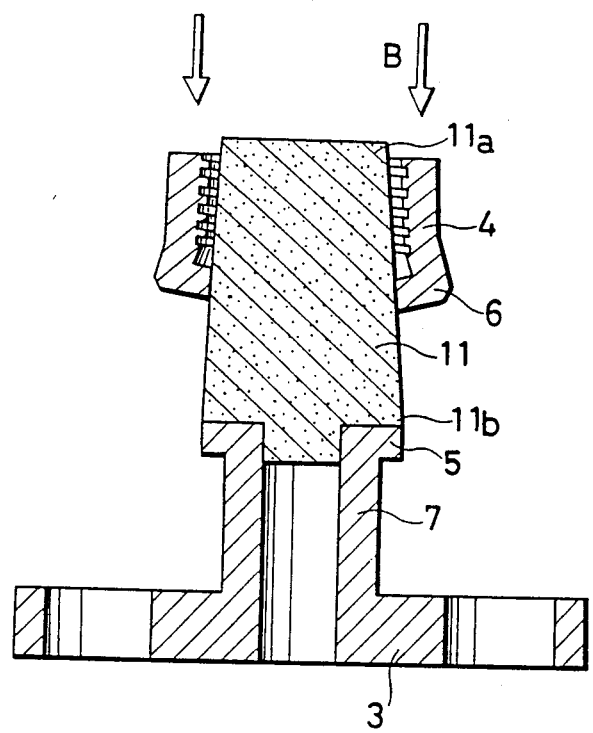
Figure 7:
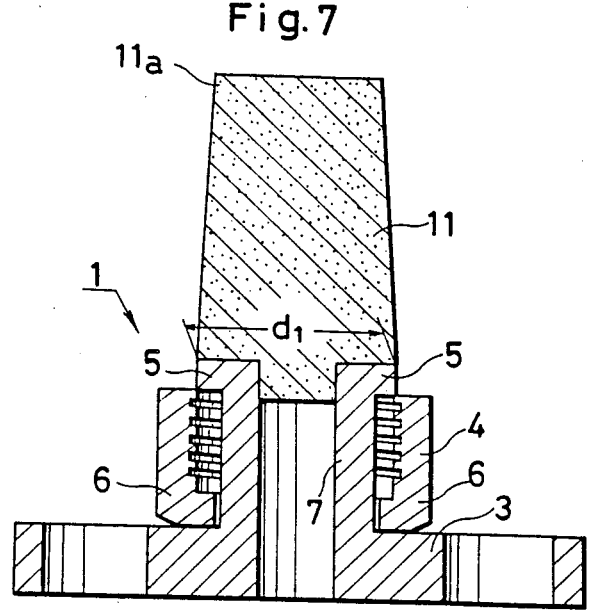

FIGS. 5 to 7 illustrate a preferrable embodiment of the process. A guide jig 11 is used to make the heated and softened flange part 6 turn to the elastically expanded state. The diameter of a upper portion 11a is equal to or smaller than the hole diameter D1 of the union nut 4, while the bottom diameter 11b is equal to the outer diameter d1 of the swivel end 5. The jig 11 is of a truncated cone shape having a tapered surface gradually expanded at the top angle from 10° to less 50°.

A margin M provides an axial length sufficient to drop the softening heat energy to ambient temperature, and the above sample required only a length of 2 mm before spiral 4a starts in order especially to protect such minute spiral from being distorted. Also the expanding force drawing the union nut 4 in a straight direction does not damage the screw section W by this margin M which may disregard the effect of heat inasmuch as it supports both the heat-softened elastic section S and hardness reserved section within it, while such force shall be absorbed to expand the softened elastic section S unless such force reaches the screw section 4a as much as the hard plastics will be affected. In addition, it is better for the auxiliary jig not to contact with the screw section 4a.

When the guide jig 11 is used as shown in FIGS. 5-7, the connecting end 3 supports vertically the union sleeve 7 and the jig 11 vertically and stably stands on the top face of the union swivel end 5. In this, a projecting boot is inserted closely in a conduit portion of the union sleeve 7 inasmuch as concentricity is more certainly maintained between union nut 4, jig 11 and swivel end 5 during expansive operation. The union nut 4 which has the flange part 6 provided with a softened elasticity characteristic by heating the zone S, is subsequently mounted at the narrow top of the jig 11 as the softened flange part 6 is approached by the jig 11. An expanding force is applied on the nut 4 in the direction of arrow B until the nut 4 passes over and engages with the swivel end 5 at the backside thereof, wherein irregular deformation can be prevented within the limitation deformation mentioned above. As shown in FIG. 6, softened elasticity is promoted along the gradually increasing tapered radial expansion surface. Desired elastic deformation of the flange part 6 allows it to ride over the swivel end 5 and then it returns to the original unwidened configuration soonafter it loses it expansive conditions. Such restoring force of the softened elasticity is remarkable inasmuch as it returns to the original configuration, perhaps within ±0.2−0.5%. Some contraction is generally expected in elastic restoration of synthetic resin because of the heat treatment.

In the case where a restoring force would not be expected to reach a desired level, an auxiliary means may be used for promoting contraction, for example a stopping device placed around union sleeve 7, on which the flanged part 6 encounters and which generates a returning action.

Figure 8:
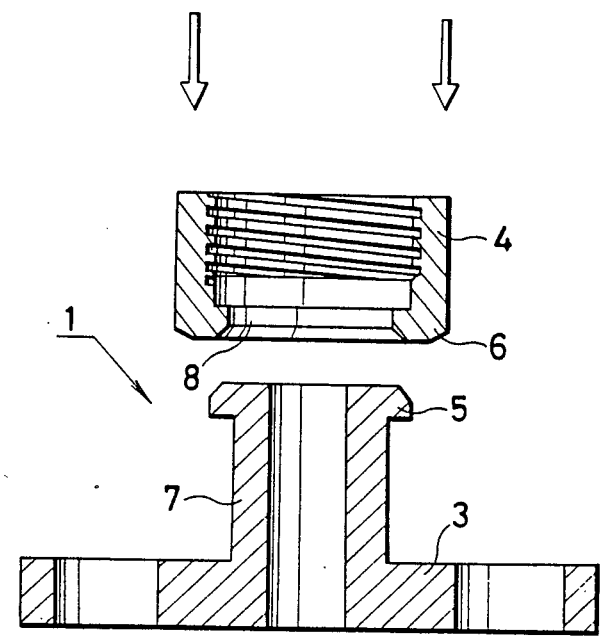
FIG. 8 illustrates another process of the present invention.

When guide jig 11 is not used, a guide face 8 is, in FIG. 8, provided on a forward end section of the union swivel end 5, which is first approached by the union nut 4. The tapering angle is similarly selected to be from 10° to than 50°. If a guide face 8 was made to have a tapering angle of 50° or more, irregular deformation might be induced in deformation motion. It is more preferable to make a forward end section of the flange part 6 tapered as the same guide face 8, the forward end section of which is first approached by the union swivel end 5. In any case, similar action shall be promoted so as to result in direct coupling between the union nut 4 and the union swivel end 5 without any assembling interfaces. An expansion force is supplied by a hydraulic pressing machine for producing a face of 200 Kg against a union nut having a 50 mm diameter, a 25 mm length and 6 mm thickness as a guide value, and the force necessary will be changed in response to the actual size of the processed matter, for example four times as much force is required if the thickness is double. However, the force is much smaller than that for radially expanding a union nut at ambient temperature without use of a softened elasticity characteristic. It needs perhaps 10 tons of force to radially expand a flange part of the union nut with the same size, but precise coupling should not be expected because distortion would not be prevented especially from the periphery of the nut hole which is formed in the flange part thereof.

According to the above process, a connecting end of the union joint can be freely designed in place of the flange type connecting end 3 mentioned above, for example a fitting type, a union joint type, a screw joint type, a receptacle or socket joint type and the like. Furthermore, the ideal, coupled structure can be applied to the other types of joints. As for the material, those with a thermoelastic property such as polypropylene, polybutylene and the like are suitable.

The union joint according to the present invention is ideal inasmuch as usual fastening means such as screw, threaded, welded, binded, ring-coupled means are not necessary. Accordingly, there is no fear of disengagement or breakage of the integrally constructed union joint.

Obviously, numerous modifications and variations of the present invention are possible in light of the above teachings. It is therefore to be understood that within the scope of the appended claims, the invention may be practiced otherwise than as specifically described herein.

What is claimed is:
1. A method for producing a synthetic resin union joint, which method comprises:
forming a union nut having a flange part and a screw portion and forming a union sleeve, said union sleeve having a union swivel end and a connecting end;

heating a length portion of said union nut at least equal to a thickness dimension of said flange part but not extending to said screw portion so as to elastically soften said length of said union nut;

abutting one end of a truncated cone-shaped expansion guide with an end face of said union swivel end such that an outer diameter of said guide substantially corresponds with an outer diameter of said union swivel end;

shifting and enlarging said length of said union nut along said expansion guide so as to pass over said union swivel end and so that said union nut passes over said guide; and returning said length of said union nut to its original configuration due to a restoring force of an elastically softenable state so as to be positioned between said union swivel end and said connecting end; and removing said expansion guide from engagement with said union swivel end.

2. The method of claim 1, wherein said step of heating said length of said union nut comprises heating a length extending to a point less than 2 mm from said screw portion of said union nut.

* * * * *